United States Patent
Parkes et al.

(10) Patent No.: US 6,189,069 B1
(45) Date of Patent: Feb. 13, 2001

(54) OPTIMIZED LOGGING OF DATA ELEMENTS TO A DATA STORAGE DEVICE

(75) Inventors: Michael Andrew Brian Parkes, Redmond; Barry Michael Nolte, Kirkland; Douglas Stewart Boa, Redmond, all of WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/024,248

(22) Filed: Feb. 17, 1998

(51) Int. Cl.$^7$ ...................................................... G06F 12/00
(52) U.S. Cl. ........................ 711/100; 711/154; 710/129; 364/494; 707/8
(58) Field of Search ..................................... 711/154, 129, 711/100; 707/8, 205; 710/129; 370/449

(56) References Cited

U.S. PATENT DOCUMENTS

| | | | |
|---|---|---|---|
| 4,602,341 | * 7/1986 | Gordon et al. | 364/494 |
| 4,888,681 | 12/1989 | Barnes et al. | 364/200 |
| 4,916,658 | * 4/1990 | Lee et al. | 711/100 |
| 5,155,803 | 10/1992 | Barabash et al. | 395/64 |
| 5,323,393 | * 6/1994 | Barrett et al. | 370/449 |
| 5,459,306 | 10/1995 | Stein et al. | 235/383 |
| 5,487,167 | * 1/1996 | Dinallo et al. | 345/302 |
| 5,488,724 | 1/1996 | Firoozmand | 709/212 |
| 5,519,865 | 5/1996 | Kondo et al. | 395/600 |
| 5,659,714 | 8/1997 | Yoshida | 711/211 |
| 5,666,532 | * 9/1997 | Saks et al. | 707/205 |
| 5,729,744 | 3/1998 | Gerken et al. | 395/619 |
| 5,758,149 | * 5/1998 | Bierma et al. | 707/8 |
| 5,761,653 | 6/1998 | Schiefer et al. | 707/2 |
| 5,815,678 | * 9/1998 | Hoffman et al. | 710/129 |
| 5,960,444 | 9/1999 | Jackson | 707/203 |

* cited by examiner

*Primary Examiner*—Do Hyun Yoo
*Assistant Examiner*—Nasser Moazzami
(74) *Attorney, Agent, or Firm*—Leydig, Voit & Mayer, Ltd.

(57) ABSTRACT

An invention for optimizing the logging of data elements to a hardware device is described. Using this invention, a large stream of data can be written to a hardware device at a rate that approaches the limits of the physical characteristics of the hardware device. To achieve this efficiency, the performance of a logging operation is divided between a data source and a data logging software processes which operate in different threads or processes. The data source collects pieces of data to be written to the hardware device into a larger buffer retrieved from a pool of empty buffers. When a buffer becomes full, the buffer is placed at the end of a full buffer queue. The data logger, operating asynchronously, retrieves a full buffer from the queue and then writes the data to the hardware. In this fashion, the hardware data logging device is able to perform optimally while creating or expanding the file.

32 Claims, 13 Drawing Sheets

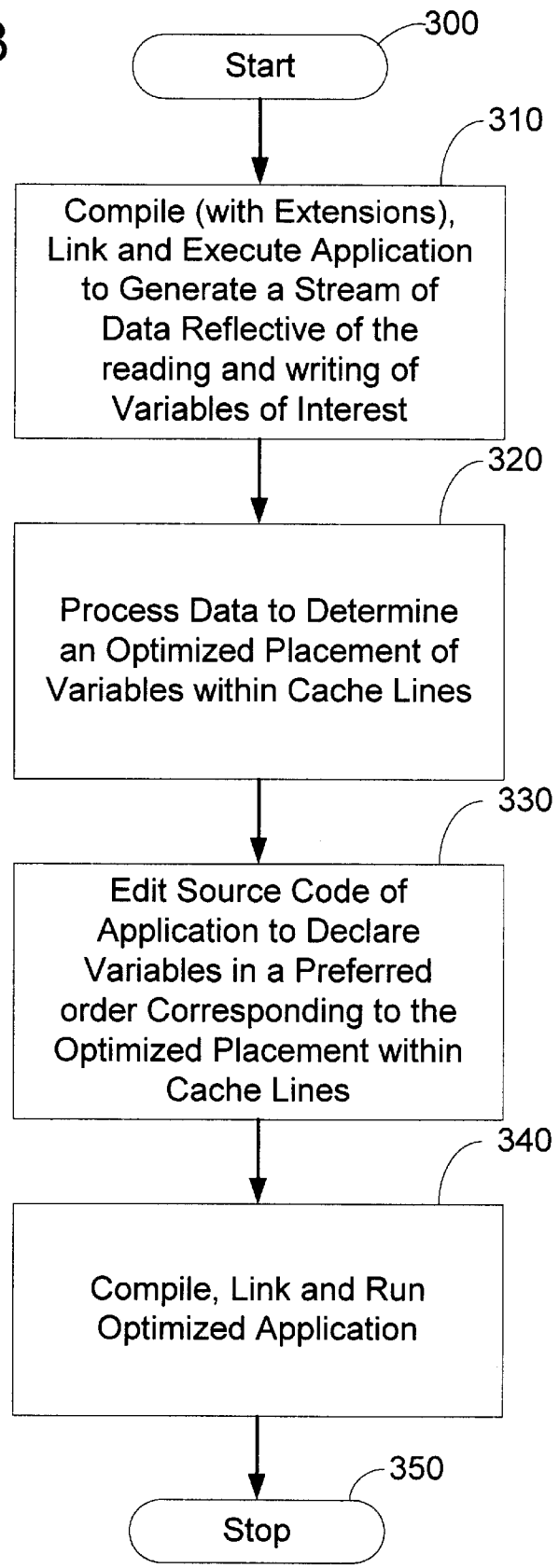

- 1 bit - read or write

- 13 bits - Offset within structure

- 18 bits - index of the structure definition in the program data structure

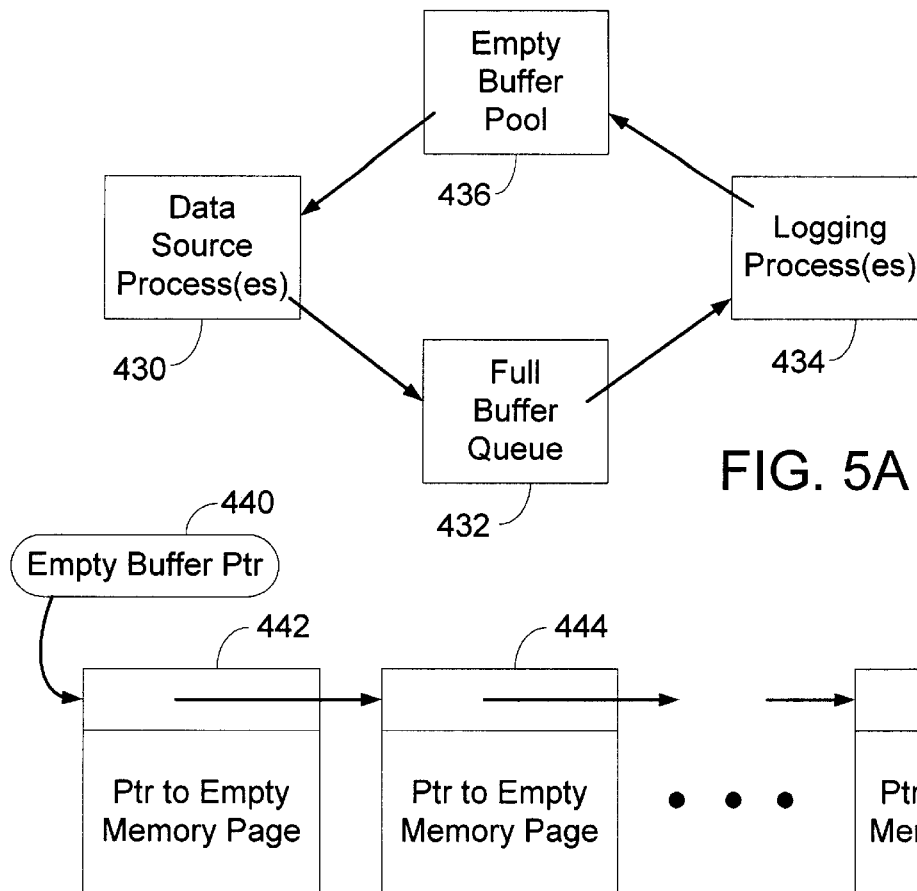
FIG. 5A
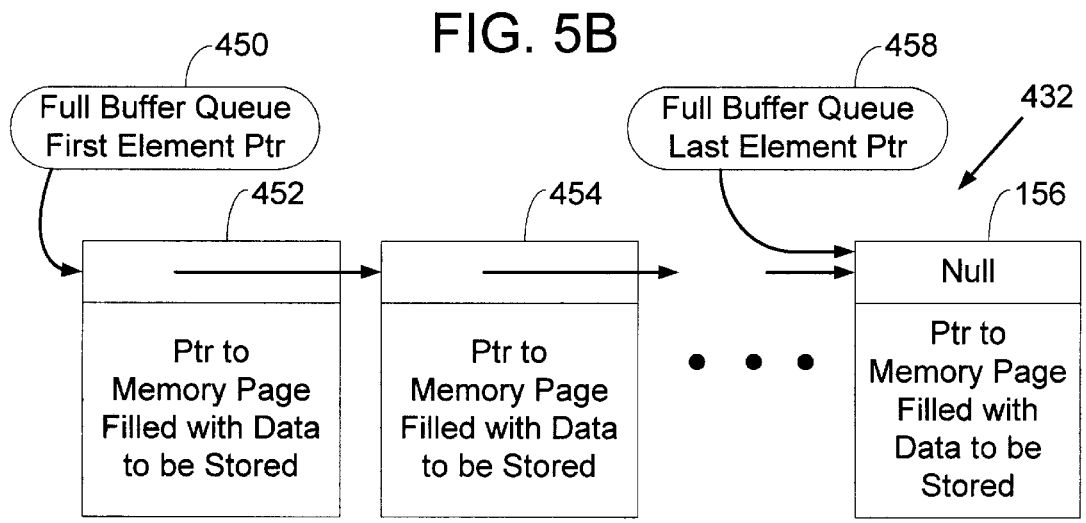
FIG. 5B
FIG. 5C

WriteFileGather
The WriteFileGather function gathers data from a set of buffers and writes the data to a file.
The WriteFileGather function starts writing data to the file at a position specified by an OVERLAPPED structure.
The WriteFileGather function operates asynchronously.

```
BOOL WriteFileGather(
  HANDLE hFile,              // handle to a file to write data to
  FILE_SEGMENT_ELEMENT aSegmentArray [],
                             // pointer to an array of buffer
                             // pointers
  DWORD nNumberOfBytesToWrite,  // number of bytes to write
  LPDWORD lpReserved,        // reserved; must be NULL
  LPOVERLAPPED lpOverlapped  // pointer to an asynchronous I/O data
                             // structure
);
```

Parameters
hFile
> An open handle to the file to write to.
> This file handle must have been created using GENERIC_WRITE to specify write access to the file,
> FILE_FLAG_OVERLAPPED to specify asynchronous I/O, and FILE_FLAG_NO_BUFFERING to specify non-cached I/O.

aSegmentArray
> Pointer to an array of FILE_SEGMENT_ELEMENT pointers to buffers. The function gathers the data it writes to the file from this set of buffers.
> Each buffer should be the size of a system memory page. Each buffer should be aligned on a system memory page size boundary.
> A FILE_SEGMENT_ELEMENT pointer is a 64-bit value. The WriteFileGather function uses all 64 bits. Since the operating systems do not currently support 64-bit memory addressing, you must explicitly zero the upper 32 bits of each FILE_SEGMENT_ELEMENT pointer.
> The function gathers the data from the buffers in a sequential manner: it writes data to the file from the first buffer, then from the second buffer, then from the next, until there is no more data to write.
> The final element of the array should be a NULL pointer.

nNumberOfBytesToWrite
> Specifies the number of bytes to write to the file.
> Windows NT
>> If nNumberOfBytesToWrite is zero, the function performs a null write operation. A null write operation does not write any bytes to the file, but it does cause the file's time stamp to change.
>> Note that this behavior differs from file writing functions on the MS-DOS platform, where a write count of zero bytes truncates a file. WriteFileGather does not truncate or extend the file. To truncate or extend a file on the Windows NT platform, use the SetEndOfFile function.

lpReserved
> This parameter is reserved for future use. You must set it to NULL.

lpOverlapped
> Pointer to an OVERLAPPED data structure.
> The WriteFileGather function requires a valid OVERLAPPED structure. The lpOverlapped parameter cannot be NULL.
> The WriteFileGather function starts writing data to the file at a position specified by the offset and offsetHigh members of the OVERLAPPED structure.
> The WriteFileGather function may return before the write operation has completed. In that case, the WriteFileGather function returns the value zero, and the GetLastError function returns the value ERROR_IO_PENDING. This asynchronous operation of WriteFileGather lets the calling process continue while the write operation completes. You can call the GetOverlappedResult, HasOverlappedIoCompleted, or GetQueuedCompletionStatus function to obtain information about the completion of the write operation.

Return Values
> If the function succeeds, the return value is nonzero.
> If the function fails, the return value is zero. To get extended error information, call the GetLastError function.
> If the function returns before the write operation has completed, the function returns zero, and GetLastError returns ERROR_IO_PENDING.

Remarks
> If part of the file specified by hFile is locked by another process, and the write operation overlaps the locked portion, the WriteFileGather function fails.

FIG. 7A- WriteFileGather

ReadFileScatter
The ReadFileScatter function reads data from a file and stores the data into a set of buffers.
The ReadFileScatter function starts reading data from the file at a position specified by an OVERLAPPED structure.
The ReadFileScatter function operates asynchronously.

```
BOOL ReadFileScatter(
    HANDLE hFile,           // handle to a file to read data from
    FILE_SEGMENT_ELEMENT aSegmentArray [],
                            // pointer to an array of buffer
                            // pointers
    DWORD nNumberOfBytesToRead,  // number of bytes to read
    LPDWORD lpReserved,     // reserved; must be NULL
    LPOVERLAPPED lpOverlapped  // pointer to an asynchronous I/O data
                            // structure
);
```

Parameters
hFile
> An open handle to the file to read from.
> This file handle must have been created using GENERIC_READ to specify read access to the file, FILE_FLAG_OVERLAPPED to specify asynchronous I/O, and FILE_FLAG_NO_BUFFERING to specify non-cached I/O.

aSegmentArray
> Pointer to an array of FILE_SEGMENT_ELEMENT pointers to buffers. The function stores the data it reads from the file into this set of buffers.
> Each buffer should be the size of a system memory page. Each buffer should be aligned on a system memory page size boundary.
> A FILE_SEGMENT_ELEMENT pointer is a 64-bit value. The ReadFileScatter function uses all 64 bits. Since the operating systems do not currently support 64-bit memory addressing, you must explicitly zero the upper 32 bits of each FILE_SEGMENT_ELEMENT pointer.
> The function stores the data into the buffers in a sequential manner: it stores data into the first buffer, then into the second buffer, then into the next, filling each buffer, until there is no more data or there are no more buffers.
> The final element of the array should be a NULL pointer.

nNumberOfBytesToRead
> Specifies the number of bytes to read from the file.

lpReserved
> This parameter is reserved for future use. You must set it to NULL.

lpOverlapped
> Pointer to an OVERLAPPED data structure.
> The ReadFileScatter function requires a valid OVERLAPPED structure. The lpOverlapped parameter cannot be NULL.
> The ReadFileScatter function starts reading data from the file at a position specified by the offset and offsetHigh members of the OVERLAPPED structure.
> The ReadFileScatter function may return before the read operation has completed. In that case, the ReadFileScatter function returns the value zero, and the GetLastError function returns the value ERROR_IO_PENDING. This asynchronous operation of ReadFileScatter lets the calling process continue while the read operation completes. You can call the GetOverlappedResult, HasOverlappedIoCompleted, or GetQueuedCompletionStatus function to obtain information about the completion of the read operation.

Return Values
> If the function succeeds, the return value is nonzero.
> If the function fails, the return value is zero. To get extended error information, call the GetLastError function.
> If the function attempts to read past the end of the file, the function returns zero, and GetLastError returns ERROR_HANDLE_EOF.
> If the function returns before the read operation has completed, the function returns zero, and GetLastError returns ERROR_IO_PENDING.

FIG. 7B- ReadFileScatter

```
BEGIN
for each element e1 in the list of data elements
    for each element e2 in the next nneighbor elements
        if ((e1 and e2 are in the same instance) & (e1 and e2 are not equal))
            if (e1 < e2)
                set Addr1 to e1
                set Addr2 to e2
                    add to hash table with the read/write in the forward direction
            else
                set Addr1 to e2
                set Addr2 to e1
                add to hash table with the read/write in the backward direction
            end if
        end if
    next e2
next e1
END
```

FIG. 10

```
BEGIN
for each structure S in Array 510
    for each value A of Address1
        if (Total Writes > (Total Reads / 3))
            /* pair Writes */
            Select cache line from the bottom of list with Address1=A
        else /* pair Rights */
            Select cache line from the top of list with Address1=A
        end if
    next A
next S
END
```

FIG. 11

| | 810 | 815 | 820 | 825 |
|---|---|---|---|---|
| 800 | Addr$_1$ | Addr$_2$ | Total Reads | Total Writes |
| | A | B | 10 | 0 |
| | A | C | 9 | 2 |
| 870 | A | E | 3 | 3 |
| | A | D | 4 | 7 |
| | A | F | 1 | 9 |
| | | | 27 | 21 |

| | 840 | 845 | 850 | 855 |
|---|---|---|---|---|
| 830 | Addr$_1$ | Addr$_2$ | Total Reads | Total Writes |
| 880 | B | I | 20 | 0 |
| | B | F | 18 | 2 |
| | B | G | 6 | 3 |
| | B | H | 8 | 7 |
| | B | C | 2 | 9 |
| | | | 54 | 21 |

FIG. 12

OPTIMIZED LOGGING OF DATA ELEMENTS TO A DATA STORAGE DEVICE

CROSS-REFERENCE TO RELATED PATENT APPLICATIONS

This application is related to the application entitled "Optimized Allocation Of Data Elements Among Cache Lines," Ser. No. 09/024,857, by Michael Andrew Brian Parkes, Barry Michael Nolte and Douglas Stewart Boa, assigned to Microsoft Corporation, and filed concurrently with this application. The disclosure of this application is hereby incorporated by reference.

FIELD OF THE INVENTION

This invention relates to computer programming, and more particularly, to the optimized logging of data elements to a data storage device.

BACKGROUND OF THE INVENTION

Users are demanding increased performance of their applications running on their computers. Computer hardware, including central processing units (CPUs), are becoming increasingly faster. However, their performance is limited by the speed at which data is available to be processed. In a typical computer, Level 1 (L1) and Level 2 (L2) cache memories are physically close to a processor to provide data at very high rates. The cache memory is typically divided into 32 byte cache lines, a cache line being the common unit of data retrieved from memory. When the required data is not available in L1 cache, a cache line fault occurs and the data must be loaded from lower speed L2 cache memory, or relatively slow RAM. The application is often effectively stalled during the loading of this data, and until such time as the data is available to the CPU. Therefore, by decreasing the number of cache faults, an application will run faster. Furthermore, data elements within an application are not randomly accessed. Rather, data elements, especially within the same structure, union, or class are typically accessed within a short period of other data elements within the same structure, union, or class.

The first step in optimizing an application is to model the usage patterns of data elements by the application. To accomplish this, the application being optimized is executed and used in a typical manner, with data being recorded that tracks the order in which the data elements are accessed. In doing so, a stream of data at a rate of 30–40 megabytes per second on typical hardware is generated. Traditional disk writing methods cannot keep up with this volume of data. Hence, if all of this data is to be collected to disk, either the disk logging process must also be optimized, or the execution of the application must be slowed down or modified which degrades the accuracy of the data usage model. Therefore, the preferred approach is to optimize the data logging such that the application being modeled is not hindered by the data logging method used.

Traditional data logging methods operate in a linear fashion by generating a first record of data, writing the first record of data to disk, generating a second record of data, writing the second record of data to disk, and so on. While this approach is simplistic, this method does not optimize the writing of a large amount of data to disk, such as the voluminous data stream generated when modeling the application. In fact, the processing overhead is so high that the linear data writing approach does not allow data to be written at the fastest rate allowed by the hardware. Rather, the data logging rate is limited by software processing of individual write operations. Such is the same problem with reading in records of data, one record at a time. Needed is a solution for writing and reading of a large amount of linear, order dependent data at high rates of speed which approach the physical limitations of the hardware device to which the data is being logged.

SUMMARY OF THE INVENTION

According to the invention, cache line groupings of data elements within a single structure, union, or class of an application are determined for minimizing the frequency of cache line faults. As used herein, the meaning of the terms "structures" or "structure" include structures, unions, classes, or the like. Furthermore, this disclosure describes the invention in terms of optimizing the performance of a computer "application". However, the invention disclosed herein is equally applicable to any computer program, including end-user applications, operating systems, objects, drivers, operating environments, library routines or objects, and the like.

Data is first collected describing the application's usage of data elements within each structure. Next, this data is manipulated to determine statistical correlations among accesses to data elements within the same structure. Optimized cache line groupings of data elements are then determined in order to maximize the probability that for any data element accessed within a structure, the next or previously accessed element will be within the same cache line. Using this optimized grouping, the source code of the application is edited to re-order the declaration statements such that the rebuilt application will have optimized groups of data elements assigned to cache lines. In this manner, the application will generate fewer cache line faults, and run more efficiently.

More specifically, an application is executed and used in a manner characteristic of a typical use of the application with accesses to the data elements being recorded. To generate this data, the source code of the application is first compiled with instrumentation being added so that a data record is produced each time a data element is accessed. Then, when the application is subsequently executed, the application generates a disk file containing a sequential stream of data records containing an entry for each time a data element is accessed and the type of access (a read or write operation). Thus, two data elements accessed one after the other will have corresponding sequential entries within the stream of data. Alternatively, a background process could be used to track the accessing of data elements.

To keep up with the 30–40 megabytes of data produced per second on typical current hardware, an optimal data logging process is used to efficiently write the stream of data to disk at a rate which approximates the maximum rate that the disk hardware can support, which cannot be achieved using traditional data writing methods. To overcome the processing limitations on the transfer rate of traditional data logging methods, the performance of a write operation is divided between data source and data logger software processes which operate in different threads, these threads being in the same process or in different processes. The data source first retrieves a buffer from a pool of empty buffers; each buffer containing references to blocks of contiguous memory addresses.

Further efficiency is gained when the size of each block of memory addresses corresponds to the file allocation size (or a multiple thereof) for the hardware device (e.g., a disk)

being employed. Normally, when a file is expanded on a hardware device, the additional space is allocated and the contents of this additional space on the disk must be erased for security reasons (i.e., to protect the prior user data stored in this newly allocated space). However, by combining (1) a file allocation request and (2) a data storage request for writing to the entire contents of the additional space requested into a single operation, the data erasing step is unnecessary and can be eliminated to increase data logging efficiency. In an embodiment of the present invention, each block of memory addresses corresponds to a page of memory which also corresponds to a file allocation size for the hardware device. A typical block of memory addresses used in an embodiment of the present invention is four (4) Kbytes in size, and will vary depending on the hardware platform on which the present invention is being practiced.

The data source then fills this memory block with data records, and when full, the buffer is placed at the end of a queue of full buffers to be written to the hardware device.

When there are buffers in the queue of full buffers, the data logger, operating asynchronously with respect to the data source, consolidates (i.e., packages) the full buffers into larger data blocks. In some instances, these larger data blocks will reference non-contiguous blocks of memory addresses (i.e. the memory addresses corresponding to the buffers comprise a non-contiguous address space). In one embodiment, an array is filled with pointers to the blocks of memory addresses contained in the buffers which were removed from the full buffer queue. For simplicity and efficiency reasons, each larger data block corresponds to the same fixed size (e.g., 64 Kbytes or 16 pages of memory). The size of the consolidated blocks is adjustable, and is preferably tailored to match the characteristics of the hardware device and its controller to achieve maximum performance. As described herein, efficiency is gained by logging chunks of data in sizes equivalent to the file allocation size (or multiples thereof) of the hardware device.

The data logger then logs the corresponding data records to the hardware device by passing the consolidated data block to a hardware controller to efficiently store the data on the hardware device. This logging of the data is performed using direct memory access (DMA). Such DMA memory accesses do not involve the computer CPU, and allow data transfer directly between memory and a peripheral device, such as a disk drive. In the Windows NT environment, the WriteFileGather operation, described in detail hereinafter, is used to synchronously write the data to disk with the consolidated block corresponding to an array of memory page pointers and a count of the number of array entries.

By decoupling the data source from the physical write operations to the disk, the data source is able to use a series of asynchronous data store operations to empty buffers, while the data logger retrieves large buffers from the full buffer queue and synchronously (or even asynchronously) writes the large buffers without stalling the data source. Using this method, the hardware data logging device is able to perform optimally up to the limits of the physical characteristics of the hardware logging device while creating or expanding a data file. Various embodiments in keeping with the invention disclosed herein include single or multiple data source and data logging processes with single or multiple empty buffer sets and full buffer queues.

In one embodiment of the invention, a total of 64 buffers (corresponding to 64 pages of memory) comprise the empty buffer pool and the full buffer queue. In keeping with the invention, the total number of buffers (and memory pages) is adjustable, with this number preferably sized to match the desired performance and memory requirements. Such matching is a classical allocated memory versus performance trade-off. If there is enough available memory given the memory requirements of the application itself, enough buffers and memory pages should be allocated such that the application is never stalled waiting for an empty buffer to which to store its data.

In keeping with the scope and spirit of the invention disclosed herein, the optimal data logging architecture and methods can also be used to efficiently read blocks of data from a hardware device. In this case, the ReadFileScatter operation (described in detail hereinafter) is used in place of the WriteFileGather operation, and the data logger receives the stream of data from the full buffer queue, with the data logger filling empty buffers with the read data.

Once the data characterizing the accesses of data elements has been collected, the recorded data stream is then manipulated to generate a data structure containing statistics describing the relationships among accesses to the structures and/or instances of structures with respect to the timing and frequency of their being accessed. In an embodiment, the data structure is built containing statistics describing the number of times pairings of intra-structure data elements are accessed within some predefined number of CPU data operations, and whether a read or write operation was performed.

For example, if there are two structures declared in a program such as:

struct example1 {int A,B,C,D,E,F,G,H,I,J,K,L;} x, y;

struct example2 {int A,B,C,D,E,F,G,H,I,J,K,L,M;} z;

the invention described herein will determine an optimized ordering of integers A–L within "example1", and A–M within "example2". In determining the optimized ordering, the attributes of the accessing of elements from within a single instantiation of a structure are analyzed. If x.A is usually accessed immediately before or after x.F, then F and A are preferably defined within example1 such they are assigned to the same cache line.

In determining the optimized groupings of intra-structure data elements, a series of linear equations are derived which provide a correlation among data elements within the same structures with respect to their accessing attributes. To derive these equations, the data stream is processed as follows.

For each structure, a series of linear equations is derived by first considering whether read or write operations predominate an element's relationship with the other data elements within the structure. By reducing the inclusion of highly written data elements within cache lines with highly read data elements, the number of cache line faults can be reduced. Therefore, linear equations are derived with highly read data elements grouped together and predominately written elements grouped together.

A data element pairing is defined to be "highly written" if the total number of write operations for the pairing is greater than one-third of the total read operations. Although other ratios can be used, this one was selected because a write operation typically takes twice the amount of time as does a read operation. For example, in a multiprocessor environment, a cache line can simultaneously be in cache memory of multiple CPUs as long as read operations are performed on the data elements within the cache line. However, a CPU must have exclusive access to a cache line before it can write to it. These linear equations are then solved based using the number of read and write operations to achieve optimized cache line groupings of highly read and highly written intra-structure data elements. These results are then used to produce recommended declaration statements or each structure. After manual or automatic editing of he application's source code, the application is reompiled and linked. Alternatively, the optimized grouping could be used as input to a compiler to automatically produce optimized cache line groupings.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

FIG. 3 is a high-level flow diagram describing the steps for determining an optimized allocation of structures within the cache lines of a computer system;

FIG. 5A is a block diagram illustrating the basic flow of data between a data source and a data logger;

FIGS. 5B–5C are block diagrams describing an embodiment of the empty buffer pool and full buffer queue;

FIGS. 7A and 7B describe the WriteFileGather and ReadFileScatter Windows NT commands;

FIG. 10 contains representative pseudo code for populating the hash table and array for rapid processing of the collected data in accordance with the invention;

FIG. 11 contains representative pseudo code for creating cache line equations; and FIG. 12 is a block diagram illustrating the process of determining how to allocate data elements to cache lines for decreasing the frequency of cache line faults.

DETAILED DESCRIPTION OF THE PREFERRED EMBODIMENT

Figure 1:
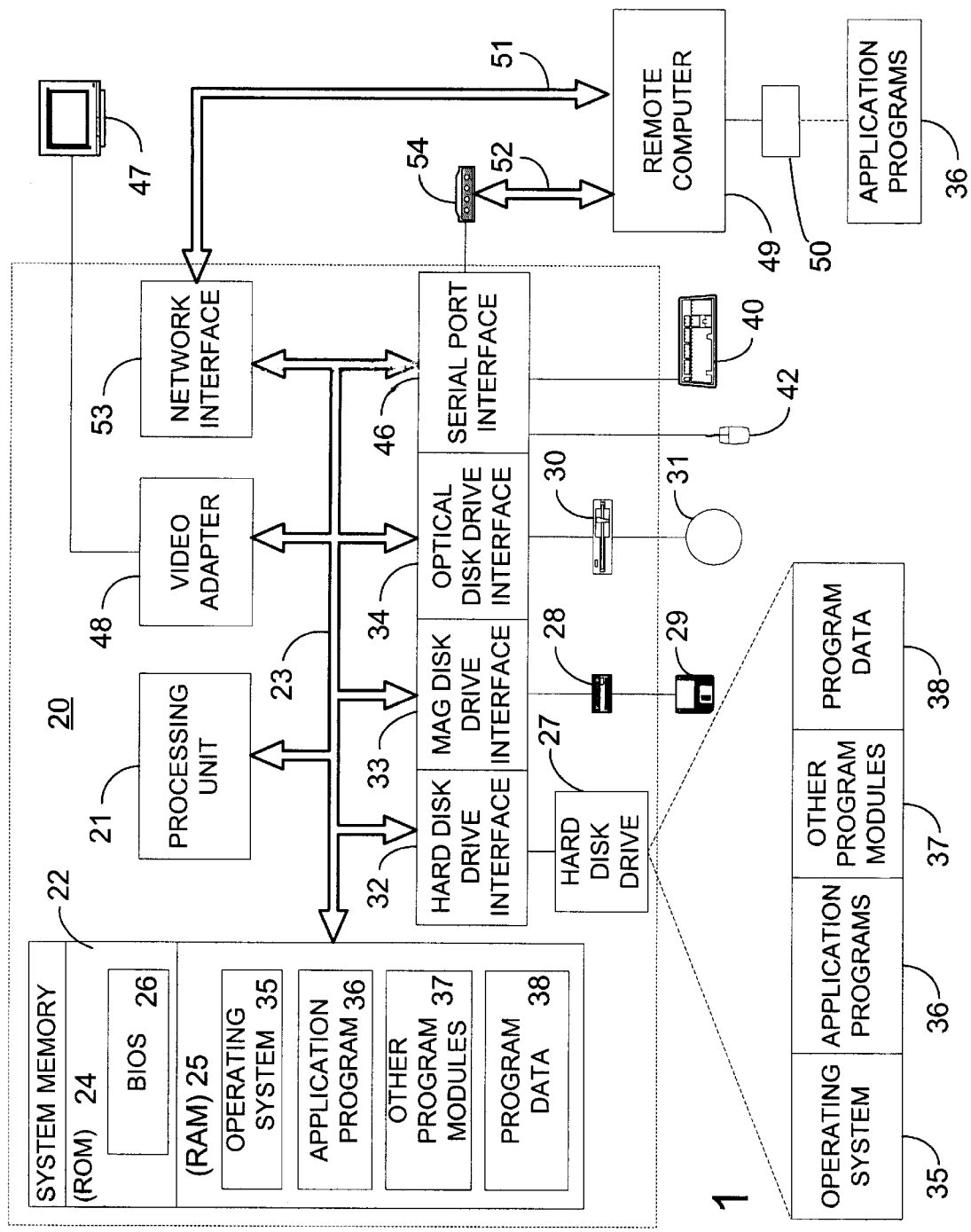
FIGS. 1, 2A and 2B are block diagrams of an exemplary operating environments in which the invention may be practiced, including a computer system for optimally logging data, determining an optimized allocation of data structure elements within cache lines, and running an optimized application.
Figure 2A:
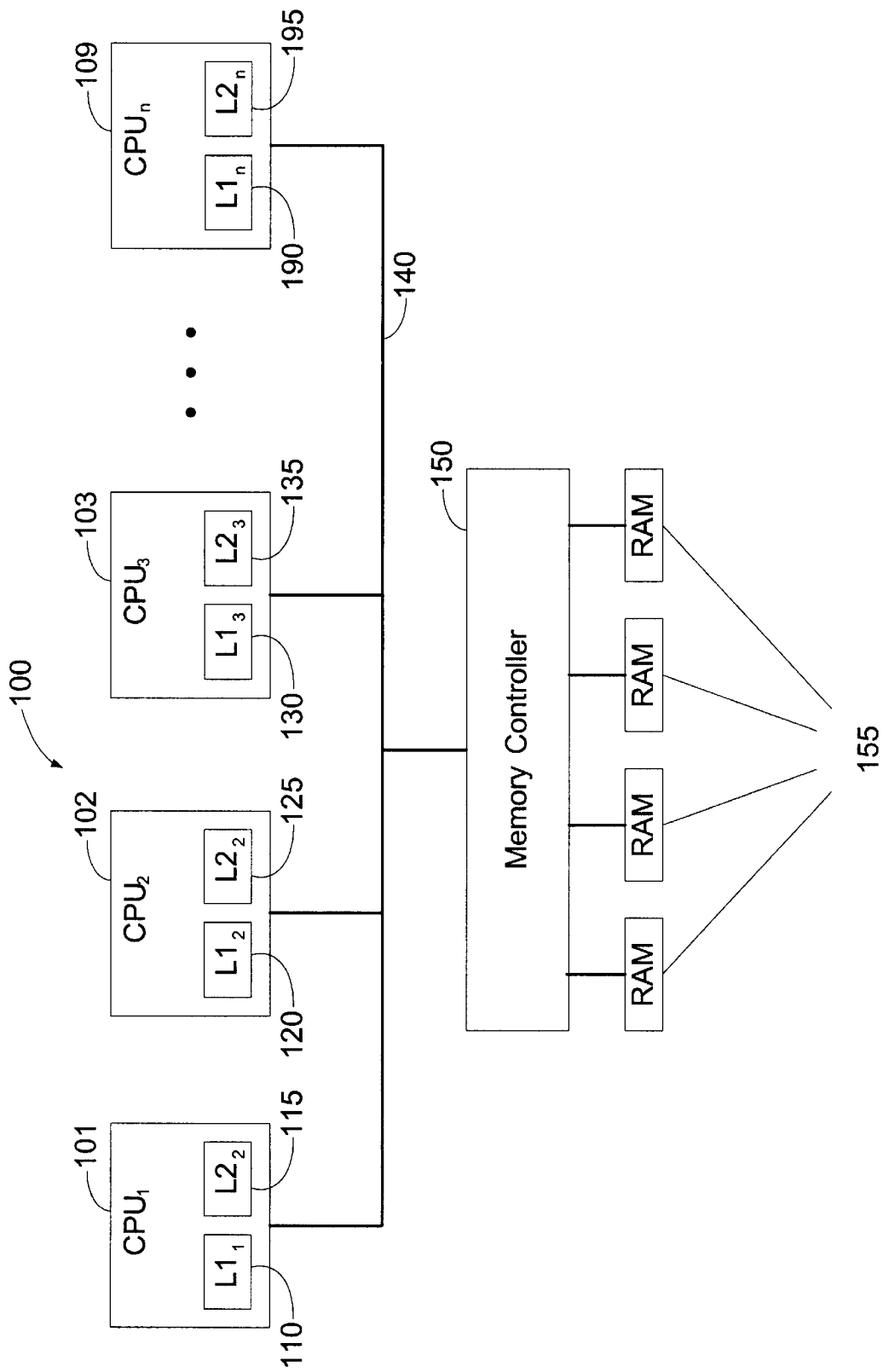
Figure 2B:
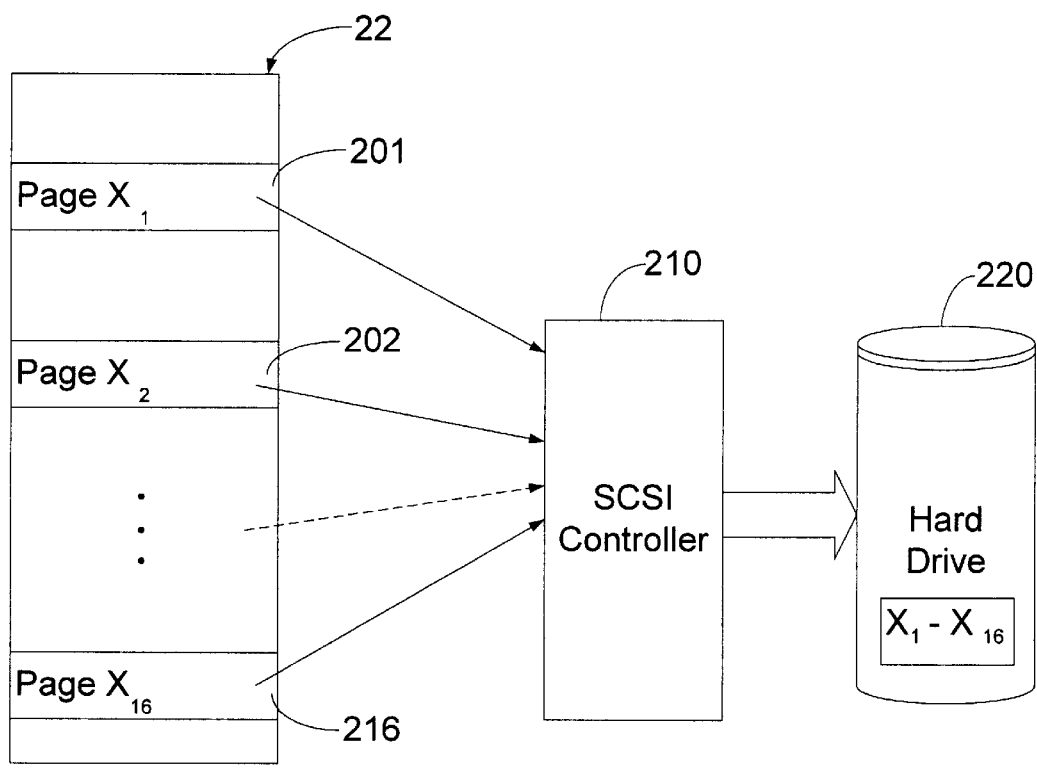

FIGS. 1, 2A and 2B and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. In one embodiment of the present invention, the commands to determine the optimized cache groupings of intra-structure data elements and to perform the optimized logging of data are stored in system memory 22 and are executed by processing unit 21. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Turning now to FIG. 2A, shown a multi-processor computing operating environment 100, which is suitable for practicing this invention and may be a particular embodiment of processing unit 21 (FIG. 1). Although FIG. 2A illustrates four (4) CPUs, any number of CPUs may be in the environment 100, including a single CPU. Each CPU 101, 102, 103 and 109 is connected to a memory controller 150 via bus 140 and includes cache memories L1 (110, 120, 130, 190) and L2 (115, 125, 135, 195). The memory controller 150 retrieves and stores data between RAM memory 155 and cache memories L1 (110, 120, 130, 190) and L2 (115, 125, 135, 195) as required by CPUs (101, 102, 103, 109).

A typical commercially available computer has extremely fast L1 cache memory (110, 120, 130, 190) which accommodates 8K bytes of code plus 8K bytes of data, and 512K bytes of fast L2 cache memory (115, 125, 135, 195). The L1 (110, 120, 130, 190) and L2 (115, 125, 135, 195) cache memories are divided into 32 byte cache lines. A cache line being the smallest unit transferred in and out of cache memories (110, 115, 120, 125, 130, 135, 190, 195). When the required data is not available to a CPU in its L1 cache (110, 120, 130, 190), a cache line fault occurs and the data must be loaded from lower speed L2 cache memory (115, 125, 135, 195), or relatively slow RAM 155. Thus, the application is stalled during the loading of this data, and until such time as the data is available to the CPU. Not only does decreasing the number of cache faults cause an application to run faster, but it also decreases the traffic load on bus 140, which can be a computer system bottleneck, especially in multi-CPU systems.

Turning now to FIG. 3, the steps for optimizing cache line groupings of elements within structures are presented. First, in step 310, the source code of the application to be optimized is compiled with a compiler to add instrumentation so that a stream of data (see FIG. 4) will be generated that logs each access to each data structure element when the application is executed. In one embodiment, the compiler inserts application programming interface (API) calls within the application to code that implements the logging functionality described herein. To profile the accessing of data elements within structures, the compiler inserts the call __DLP__Profiling just at the start of every basic block in the program. __DLP__Profiling is defined as int *__DLP__Profiling(void *CurrentProcAddr, int Size), where CurrentProcAddr is the address of the current function (the function into which this API has been inserted). The value of CurrentProcAddr is used to find the name of the function in the program database (i.e., the PDB file generated by the linker). The Size parameter is the amount of space in bytes required to store all of the memory references made in this basic block. The compiled application is then linked with data source and logger code for logging the data as described herein to produce a second version of the executable application. This application is then executed and used in a typical manner such that the generated data stream characterizes the accessing of data elements during a typical execution session of the application.

Figure 4:
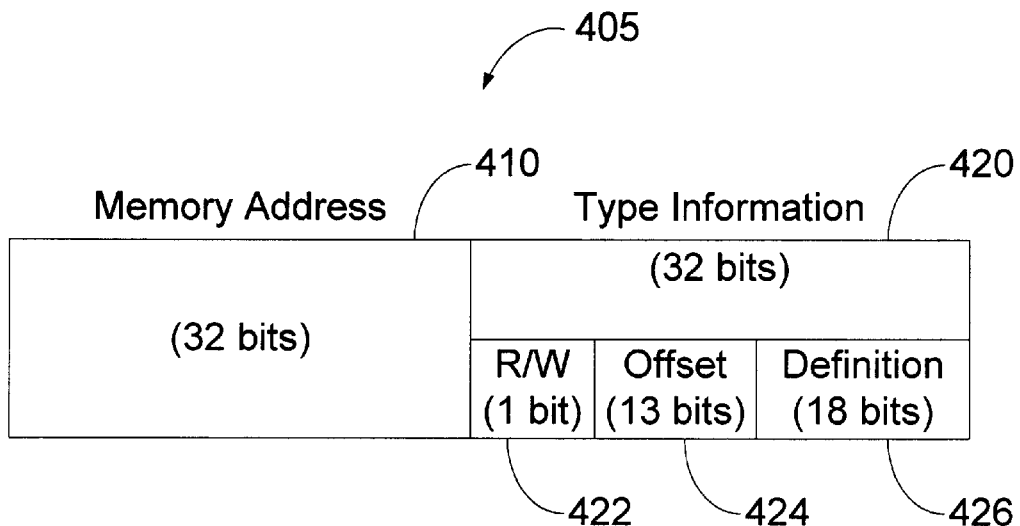
FIG. 4 is a block diagram of a data record generated by the application to be optimized which describes an operation on a data element of a structure, union, or class.

FIG. 4 illustrates a record 405 generated for each data element accessed during execution of the application. As shown, record 405 is composed of a 32-bit memory address 410; and 32 bits of type information 420 containing a R/W bit 422 indicating whether the data element was read or written, a 13-bit offset variable 424 corresponding to the offset value of the data element within its structure; and an 18-bit definition variable 426 indicating the structure to which the data element belongs. In keeping with the scope and spirit of the invention, this data could have been written in a numerous different formats (e.g., individual data records rather than using bit fields as described herein for preserving space) and additional information could have been recorded. Moreover, the sizes of these bit fields will vary among compilers employed and computer systems in which the invention is practiced.

To be able to write these data elements at the rate at which they are produced, the optimal data logging method disclosed herein is used. Referring to FIG. 2B, shown is a high-level hardware block diagram representing the optimal data logging method. In one embodiment, sixteen 4 Kbyte memory pages $X_1$-$X_{16}$ (201, 202, 216) within the system memory 22 of computer system 20 (FIG. 1) are filled with data records 405 (FIG. 4). Within each memory page (201, 202, 216), the data records 405 are sequentially stored at increasing memory addresses. Once full, memory pages $X_1$-$X_{16}$ (201, 202, 216) are collected, and an array of pointers and a count of array entries are passed to a SCSI controller 210, which writes the memory pages (201, 202, 216) to the hard drive 220 using the WriteFileGather operation (described in FIG. 7A) on a computer system 20 running the Windows NT operating system. The software processing is described in detail herein with reference to FIGS. 5A–5C, 6A–6B and 7A–7B. Although this invention is described in the context of a personal computer 20 running the Windows NT operating system, this invention could be practiced on any computer platform and operating system. In addition, the functionality of the WriteFileGather operation could be provided as an operating system service, by another application, or implemented as part of the data logger itself. Furthermore, multiple data sources, multiple data loggers, multiple hardware devices, and different disk logging techniques such as disk striping can be incorporated into the methods and systems disclosed herein in keeping with the scope and spirit of the invention.

Turning first to FIG. 5A, shown is a high-level view of the software architecture for optimally logging data produced by a data source 430 which is in a separate process than the data logger 434 which manages the writing of the data to a hard drive or other hardware device. As illustrated, the present invention can have multiple data sources 430 and/or multiple data loggers 434. This optimal data logging method uses two sets of buffers, the empty buffer pool 436 and the full buffer queue 432. These sets of buffers can be implemented as linked list structures as illustrated in FIGS. 5B–5C, arrays, or by using a multitude of other data structures commonly known in the computer arts. Similarly, the optimal data logging architecture presented in FIG. 5A can be readily expanded to incorporate multiple data sources 430, and multiple data loggers 434 which could efficiently store the data on multiple devices.

Figure 6A:
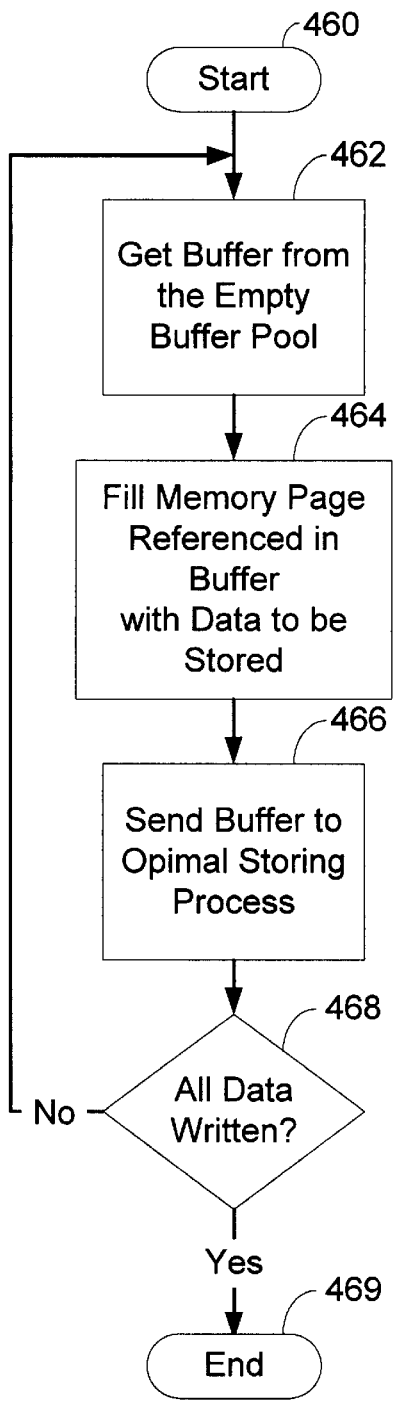
FIG. 6A is a high-level flow diagram describing the processing by the data source.

Next, in FIG. 6A, a flow diagram for the data source 430 (FIG. 5A) is presented. In step 462, a pointer to an empty buffer (442, 444, 446) (FIG. 5B) from the empty buffer pool 436 (FIGS. 5A, 5B) is retrieved. Next, in step 464, memory pages referenced within the retrieved buffer are sequentially filled with the data to be logged. After the buffer is full, a pointer to the newly filled buffer is then placed at the end of the full buffer queue 432 (FIGS. 5A, 5C) to maintain the ordering of the data. The data source 430, next in step 468, determines whether there is more data to be written. If so, this process is repeated.

Figure 6B:
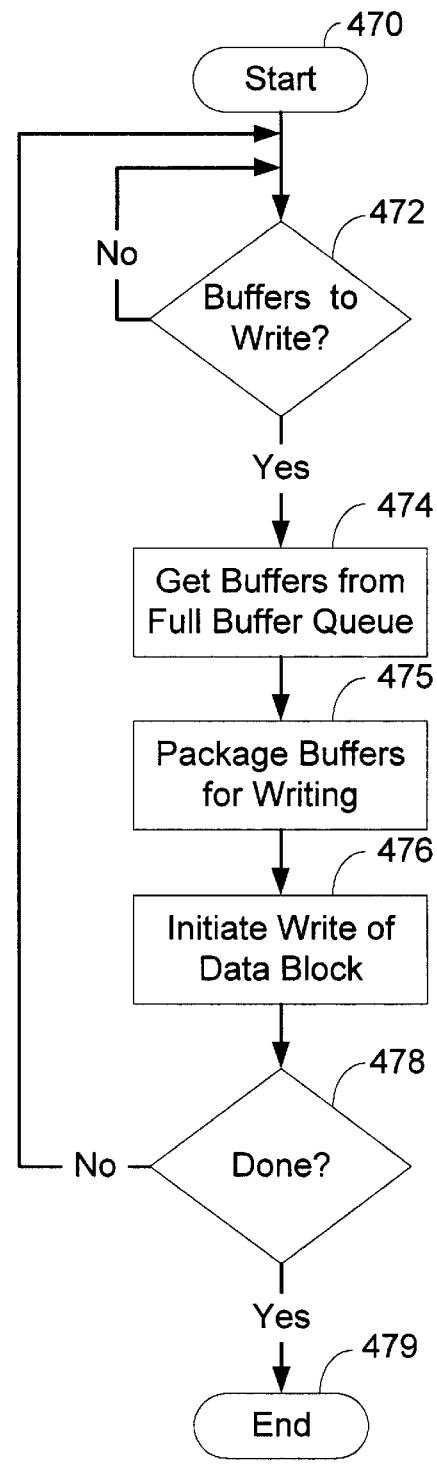
FIG. 6B is a high-level flow diagram describing the processing by the data logger.

FIG. 6B provides a flow diagram for the data logger 434 (FIG. 5A), which is operating in a separate thread from that of the data source 430. In step 472, the full buffer queue 432 (FIGS. 5A, 5C) is examined to see if there are any buffers to write. When there are buffers in the queue of full buffers, processing continues with step 474 in which buffers are retrieved from the front of the full buffer queue 432 (FIGS. 5A, 5C). Next, in step 475, these buffers are consolidated and packaged for writing to the hardware device. In the Windows NT environment, sixteen buffers (corresponding to 64 Kbytes or sixteen 4 Kbyte memory pages) are packaged into a larger data block by filling an array with pointers to memory pages retrieved from the full buffer queue 432. In one embodiment, better overall logging performance is achieved by limiting the data block to contain no more than one-half of the total number of buffers. After which, the writing of the packaged larger data block is performed in step 476. This writing of the data is performed using direct memory accesses (DMA). Such DMA memory accesses do not involve the computer CPU, and allow data transfer directly between memory and a peripheral device, such as a disk drive. In the Windows NT environment, the WriteFileGather command, described in FIG. 7A, logs the data to a hard disk after being passed the larger data block and the number of array entries which then. In other computing environments in which this invention is practiced, the logging process can use a command provided by the operating system of that environment or implement the functionality within itself. After the write operation is completed, step 478 is executed to determine if the logging process should end. If not, then the steps illustrated by this flow diagram are repeated.

Returning to FIG. 3, in step 320, the voluminous data stream is processed to determine an optimized ordering of data elements within each structure as explained with reference to FIGS. 5–9. FIG. 9 provides a flow diagram of the processing of step 320. In step 610, the Hash Table 500 and array 510 represented in FIG. 8 are populated with the collected data for pairs of data elements within the same instance of a structure accessed within some number of operations of each other.

Figure 8:
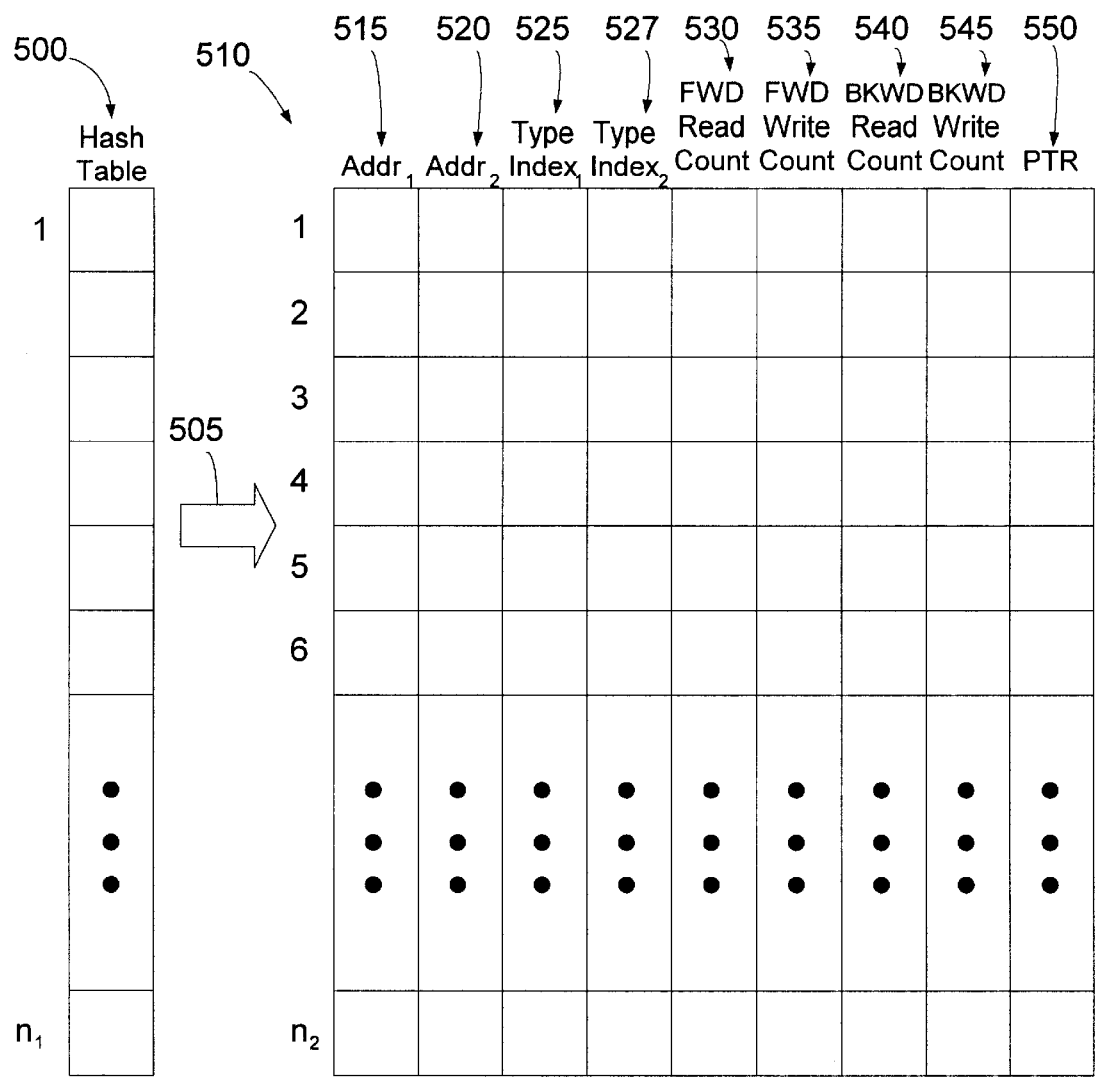
FIG. 8 is a block diagram of a hash table and array used in processing the data collected from the application to be optimized.
Figure 9:
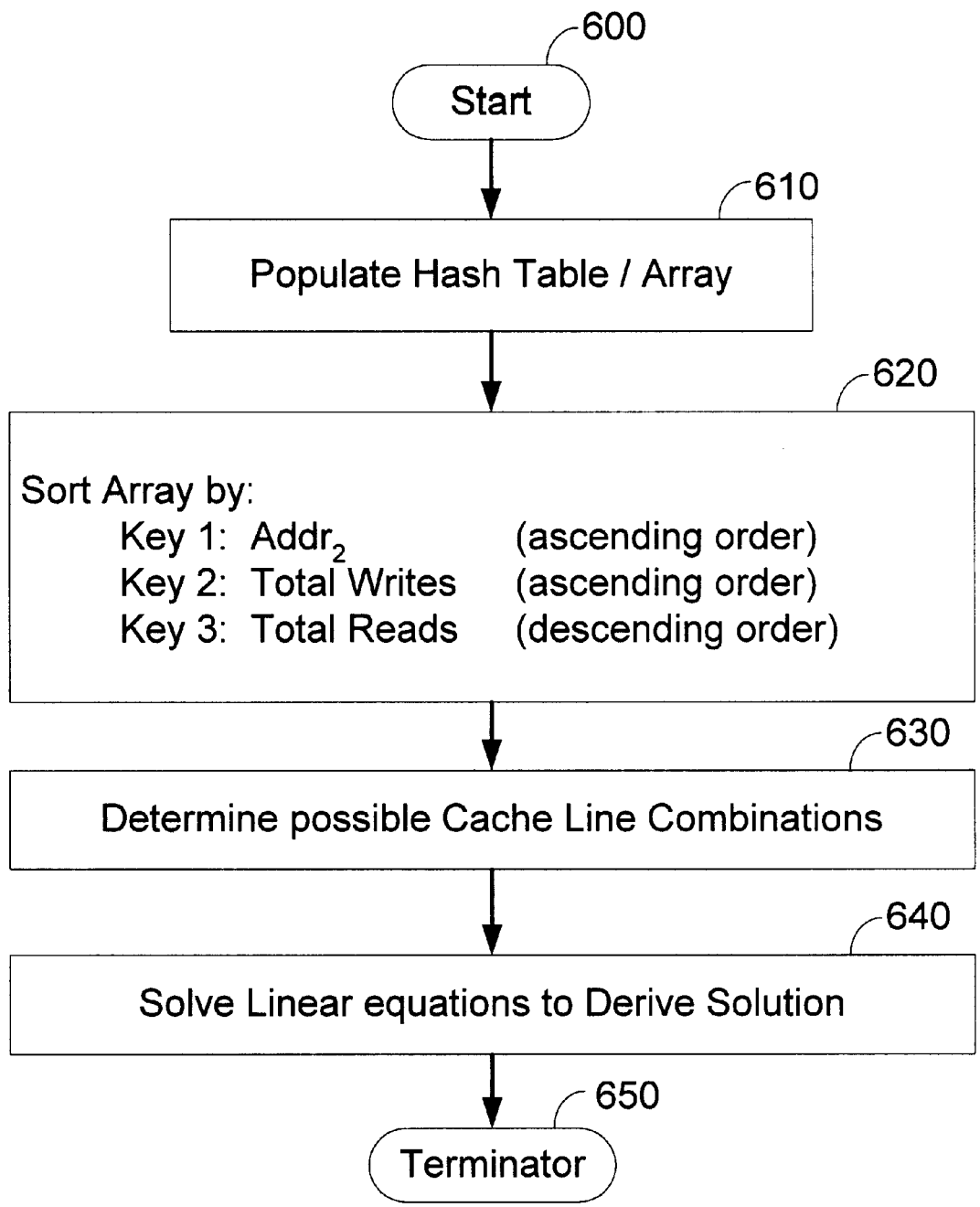
FIG. 9 is a flow diagram describing the steps for processing the collected data to determine an optimized grouping of data elements within a cache line.

Turning to FIG. 8, Hash Table 500 provides the hashing table entry point with the individual elements of the hash table stored in Array 510 in a conventional linked list manner using Pointer (PTR) 550. A hashing function is used because of the sparsely populated nature of the pairings of the data elements. In one embodiment, Hash Table 500 is sized to be one-eighth the size of the computer's virtual address space; and the hashing function uses the concatenation of $Address_1$ and $Address_2$ as its seed. As would be evident to one skilled in the art, numerous other hash table sizes and hashing functions could be used, or some other data storage technique used.

Looking at array 510, each entry has seven data elements in addition to the Pointer 550. First, $Address_1$ ($Addr_1$) and $Address_2$ ($Addr_2$) store the addresses of the first and second element in the pair of elements plotted.

Type $Index_1$ and Type $Index_2$ correspond with Type Index 420 (FIG. 4) from the data stream for the data element stored at the $Address_1$ and $Address_2$, respectively. Counts are kept for all read and write operations between the data elements stored at $Address_1$ and $Address_2$. For efficiency while retaining additional information, forward and backward counts are kept for read and write operations, and $Address_1$ is defined as always being less than $Address_2$ in Array 510. If, however, in sequencing through the data stream and a reference was made to a data element with a higher address, then the backward respective counter is used.

Pseudo code for populating the Hash Table 500 and Array 510 according to step 610 is provided in FIG. 10. For each element in the stream, the next $n_{neighbor}$ subsequent elements are added to the Hash Table 500 and Array 510. In one embodiment, $n_{neighbor}$ has been set to 256, corresponding to 8K (bytes L1 cache memory) divided by 32 (bytes per cache line). However, the value of $n_{neighbor}$ can vary depending on the application being optimized. For example, a larger number might be used if a large number of data items are already allocated to the appropriate cache line; or possibly a smaller number would be better if a large amount of outside data (e.g., __imp__foo data or other compiler generated memory references) is being touched between accesses to data elements within the same structure definitions.

After all data elements in the stream have been added in accordance with the invention, the elements in Array 510 are processed to determine the optimized cache line allocation. Returning to FIG. 9, step 620 is performed to order the array 510 sorting (key 1) by the $Address_1$ in ascending order; (key 2) by total (forward plus backward) writes in ascending order; and (key 3) by total (forward plus backward) reads in descending order. By sorting first by $Address_1$, all entries in the Array 510 for each structure are continuous as conventional compilers require structures to occupy a single block of memory. Finally, sorting by the second and third keys order the entries for any given $Address_1$ such that the entries with the most writes propagate down, and those with the most reads propagate upwards.

Next, in step 630, the possible cache line combinations for each structure are generated to form a series of linear equations as described in the pseudo code of FIG. 11. For any given value of $Address_1$ in each structure, a determination is made whether read or write operations predominate the accessing of the potential cache line allocation. A calculation is made to determine if the total number of write operations for the value of $Address_1$ is less than one-third of the total number of read operations, then the cache line is composed of predominately written data elements, else by predominately read data elements. Then, a linear equation is comprised by selecting data elements from the bottom or top of those elements with the value of $Address_1$ depending on whether write or read operations respectively predominate.

An illustration of the operation of the pseudo code of FIG. 11 is provided in FIG. 12, which shows a series of entries for two different values of Address₁ for a single structure. First, for the entries with Address₁ equal to A, because write operations predominate (i.e., total writes is not less than one-third the total reads), enough data elements are selected to fill a cache line from the bottom of the sub-list 800. The selected data elements are shown within box 870. Therefore, a linear equation will include the data elements A, E, D, and F. Also, this equation will have a weighting $\bar{\omega}$ of 27, the number of data accesses to these data elements. In other words, $\bar{\omega}$ (ADEF)=0+(4+7)+(3+3)+(1+9)=27.

Next, referring to sub-list 830 for Address₁ equal to B, as read operations predominate, the linear equation is formed from elements at the top of sub-list 830. This linear equation will include the data elements B, I, F, and G. This equation will have a weighting $\bar{\omega}$ of 49, the number of data accesses to these data elements. In other words, $\bar{\omega}$ (BFGI)=0+(20+0)+(18+2)+(6+3)=49.

Once all the linear equations for a structure are derived, these equations are solved in a conventional manner well known in the computer and mathematical arts as indicated in step 640 of FIG. 9. Once these equations are solved, an optimized grouping of data elements will have been determined for each structure. Continuing with the example presented in FIG. 12, the two derived potential cache line groupings were ADEF and BFGI, which both contain the element F. Therefore, only one of these groupings can be used (i.e., a data element can only be in one cache line). Because $\bar{\omega}$ (BFGI)>$\bar{\omega}$ (ADEF), (i.e. 49>27), the grouping BFGI is selected, and new potential grouping of ACDE will be selected from sub-list 800.

The solution of these linear equations provide the preferred optimized cache line groupings for the data structures of the application. The source code of the application is then edited to reflect this ordering as indicated in step 330 of FIG. 3. This editing can either be done manually or automatically, and the changes can be set-up as conditional definitions (e.g., using #ifdef statements) such that a switch can be set to direct the compiler to use the original or optimized structure definitions. The application is then compiled and linked per step 340, resulting in the optimized application which can be executed.

In view of the many possible embodiments to which the principles of our invention may be applied, it should be recognized that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. In a computer system, a method for logging data produced by a data source to a hardware device by a data logger operating in a separate thread than the data source, the method comprising the steps of:

retrieving from a set of empty buffers, by the data source, a first buffer pointing to a first page in memory;

storing in the first page in memory, by the data source, data records to be logged to the hardware device;

placing the first buffer in a queue of full buffers;

retrieving from the set of empty buffers, by the data source, a second buffer pointing to a second page in memory;

storing in the second page in memory, by the data source, data records to be logged to the hardware device;

placing the second buffer in the queue of full buffers;

retrieving, by the data logger, the first and second buffers from the queue of full buffers;

packaging the first and second buffers into a data block; and logging on the hardware device the data stored in the memory pages corresponding to the buffers contained in the data block.

2. The method of claim 1, wherein the logging step is performed using direct memory access (DMA).

3. The method of claim 1, wherein the logging step includes passing the data block to a hardware controller for logging on the hardware device.

4. The method of claim 3, wherein the logging step includes using a WriteFileGather operation.

5. The method of claim 3, wherein the hardware controller is a SCSI device controller.

6. The method of claim 3, further comprising the step of returning the first and second buffers to the set of empty buffers after the logging step is performed.

7. The method of claim 1, wherein the hardware device is a hard disk drive.

8. The method of claim 1, wherein the logging step is performed using a synchronous write operation to the hardware device.

9. The method of claim 1, wherein the logging step is performed using an asynchronous write operation to the hardware device.

10. The method of claim 1, wherein the data source and data logger operate in separate processes.

11. The method of claim 1, further comprising a second data source operating in a separate thread than the data logger, the method further comprising the steps of:

retrieving from the set of empty buffers, by the second data source, a third buffer pointing to a third page in memory;

storing in the third page in memory, by the second data source, data records to be logged to the hardware device; and placing the third buffer in the queue of full buffers;

retrieving from the set of empty buffers, by the second data source, a fourth buffer pointing to a fourth page in memory;

storing in the fourth page in memory, by the second data source, data records to be logged to the hardware device; and placing the fourth buffer in the queue of full buffers;

retrieving, by the data logger, the third and fourth buffers from the queue of full buffers;

packaging the third and fourth buffers into a second data block; and logging on the hardware device the data stored in the memory pages corresponding to the third and fourth buffers contained in the second data block.

12. The method of claim 1, wherein the computer system further comprises a second hardware controller, a second hardware device, and a second data logger, the method further comprising the steps of:

retrieving from the set of empty buffers, by the data source, a third buffer pointing to a third page in memory;

storing in the third page in memory, by the data source, data records to be logged to the second hardware device;

placing the third buffer in the queue of full buffers;

retrieving from the set of empty buffers, by the data source, a fourth buffer pointing to a fourth page in memory;

storing in the fourth page in memory, by the data source, data records to be logged to the second hardware device;

placing the fourth buffer in a queue of full buffers;

retrieving, by the second data logger, the third and fourth buffers from the queue of full buffers;

packaging the third and fourth buffers into a second data block; and logging on the second hardware device the data stored in the memory pages corresponding to the buffers contained in the second data block.

13. A computer-readable medium having computer-executable instructions representing the method of claim 1.

14. In a computer system, a method for logging a stream of data produced by a data source to a hardware device by a data logger operating in a separate thread than the data source, the method comprising the steps of:

retrieving from a set of empty buffers a first buffer pointing to a first block of memory;

filling the first block of memory with data records from the stream of data;

placing the first buffer in a queue of full buffers;

retrieving from the set of empty buffers a second buffer pointing to a second block of memory;

filling the second block of memory with data records from the stream of data;

placing the second buffer in the queue of full buffers;

retrieving the first and second buffers from the queue of full buffers;

packaging the contents of the first and second buffers into a larger data block;

passing the larger data block to a controller for logging the data stored in the first and second blocks of memory on the hardware device; and logging the data stored in the first and second blocks of memory on the hardware device.

15. The method of claim 14, wherein the data source and data logger operate in separate processes.

16. The method of claim 14, wherein the first and second blocks of memory together do not comprise a contiguous block of memory.

17. The method of claim 14, wherein the logging step includes transferring the data using direct memory access (DMA).

18. The method of claim 17, wherein the hardware device is a disk.

19. The method of claim 18, wherein the logging step includes expanding the size of a data file stored on the disk with a single operation.

20. The method of claim 19, wherein the packaging step packages an amount of data equivalent to a multiple of the file allocation size of the disk.

21. The method of claim 19, wherein the size of the first and the size of second blocks of memory are both a multiple of the file allocation size of the disk.

22. The method of claim 19, wherein the passing the larger data block to the hardware controller is performed by the WriteFileGather operation.

23. The method of claim 14, further comprising the step of placing the first and second buffers in the set of empty buffers after the data records of the larger data block have been logged on the hardware device.

24. A computer-readable medium having computer-executable instructions representing the method of claim 14.

25. The method of claim 14, wherein the data source comprises a plurality of applications.

26. In a computer system, a method for logging data produced by a data source to a hard disk drive by a data logger operating in a separate thread than the data source, the method comprising the steps of:

retrieving from a set of empty buffers, by the data source, a first buffer pointing to a first page in memory;

storing in the first page in memory, by the data source, data records to be logged to the hard disk drive;

placing the first buffer in a queue of full buffers;

retrieving from the set of empty buffers, by the data source, a second buffer pointing to a second page in memory;

storing in the second page in memory, by the data source, data records to be logged to the hardware device;

placing the second buffer in the queue of full buffers;

retrieving the first and second buffers from the queue of full buffers;

packaging the addresses contained in the first and second buffers in a parameter array;

passing the parameter array to a hard drive controller;

logging on the hard disk drive the data stored in the memory pages corresponding to the addresses contained in the parameter array; and returning the first and second buffers to the set of empty buffers.

27. The method of claim 26, wherein the data source and data logger operate in separate processes.

28. The method of claim 27, wherein the logging step includes transferring the data using direct memory access (DMA).

29. The method of claim 28, wherein the first and second memory pages together do not comprise a contiguous block of memory.

30. The method of claim 29, wherein the size of the first and second buffers are a multiple of the file allocation size of the disk.

31. A computer-readable medium having computer-executable instructions representing the method of claim 26.

32. The method of claim 26, wherein the passing of the parameter array step is performed using the WriteFileGather operation.

* * * * *

UNITED STATES PATENT AND TRADEMARK OFFICE
CERTIFICATE OF CORRECTION

PATENT NO. : 6,189,069 B1
DATED : February 13, 2001
INVENTOR(S) : Parkes et al.

It is certified that error appears in the above-identified patent and that said Letters Patent is hereby corrected as shown below:

<u>Column 5,</u>
Line 5, "he" should read -- the --, and "reompiled" should read -- recompiled --.

Signed and Sealed this

Second Day of April, 2002

*Attest:*

JAMES E. ROGAN
*Director of the United States Patent and Trademark Office*

*Attesting Officer*